July 23, 1968  G. W. WINDHAM  3,393,722
BIT END OF TOOL
Filed July 19, 1966

INVENTOR.
GEORGE W. WINDHAM
BY Kimmel, Crowell & Weaver
ATTORNEYS.

United States Patent Office 3,393,722
Patented July 23, 1968

3,393,722
BIT END OF TOOL
George W. Windham, Box 20255, Colonial Station,
Sacramento, Calif. 95820
Filed July 19, 1966, Ser. No. 566,285
1 Claim. (Cl. 145—50)

ABSTRACT OF THE DISCLOSURE

A screw driver having a bit end of extremely hard material and a shank of relatively softer metal, the shank having an opening in the end thereof, said bit end having engaging vanes thereon and a pin for extending into the opening of the shank, the bit end being secured to the shank by a weld bead formed between the shank and the bit end is disclosed.

---

This invention relates to bit ends of tools and more particularly to a bit end of a screw driver or the like for turning threaded fasteners into a work piece.

When a screw having a recess head, such as a Phillips recess, is to be driven into a work piece, the bit end of the driving tool or screw driver is inserted into the recess in order to provide a driving connection between the fastener and the tool. As the shank of the fastener penetrates the work piece, the torque applied to the walls of the recess increases greatly and the reaction of these walls on the tool tends to disengage the bit end of the tool out of the recess. The disengagement of the tool with the recess is termed "backing off" by those skilled in the art and causes damage to the bit end of the tool and to the walls of the fastener recess. After some length of time in heavy use, the tool must be discarded because of the deformation of the bit end. This is particularly true in metal work where the screw fastener is normally quite hard.

In brief terms, the instant invention comprises a screw driving tool having a shank and a bit end comprised of a plurality of vanes extending substantially radially of the shank with at least the exterior surface of the bit end being tungsten carbide. Another feature of the instant invention resides in the connection of the bit end to the tool shank to create a strong durable joint.

It is a primary object of the instant invention to provide a screw driving tool which is extremely hard and tough to prevent injury to the tool resulting from "back off."

Another object of the instant invention is to provide a tool of the character described comprised of a relatively inexpensive metal shank and a tungsten carbide bit end coaxially affixed to the shank.

A further object of the instant invention is to provide a two-piece screw driving tool in which a tungsten carbide bit end is welded to a tool shank.

Other objects and advantages of the instant invention reside in the combinations of elements, arrangements of parts, and features of construction and operation, all as will be more fully pointed out hereinafter and disclosed in the accompanying drawing wherein there is shown a preferred embodiment of this inventive concept.

Figure 1:
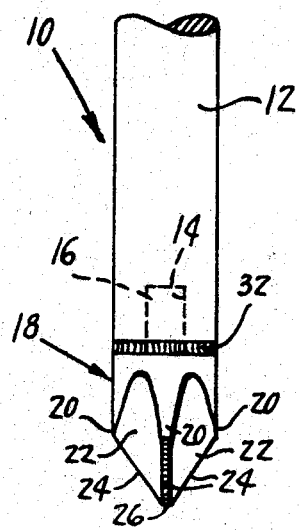
FIGURE 1 is a partial front elevational view of a screw driving tool illustrating the bit end of the instant invention coaxially welded to a tool shank.

Referring now to the drawing in detail, wherein like reference characters designate like elements throughout the several views thereof, the screw turning tool of the instant invention is illustrated generally at 10 and comprises an elongate shank 12 carrying a handle (not shown) at one end thereof. The other end of shank 12 forms a blind aperture 14 for receiving a pin 16 of the bit of the instant invention shown generally at 18.

Bit 18 preferably consists essentially of tungsten carbide although a tungsten carbide coating has proved satisfactory. Since the method of coating tungsten carbide on stock material is well known in the art and does not constitute a part of the instant invention, no further description thereof is deemed necessary.

Bit end 18 is substantially cylindrical at the upper end thereof and includes a plurality of vanes 20 equally spaced about the axis of bit 18 and shank 12. The side faces 22 between each of vanes 20 preferably converge slightly toward the tip end of bit 18. The terminal edges 24 of vanes 20 converge to a point 26 adapted to be received in the center of the recessed head fastener. It should be readily apparent that the end of bit 18 describes a conventional Phillips screw driver head, although any other type of bit end configuration is within the scope of the instant invention.

Figure 2:
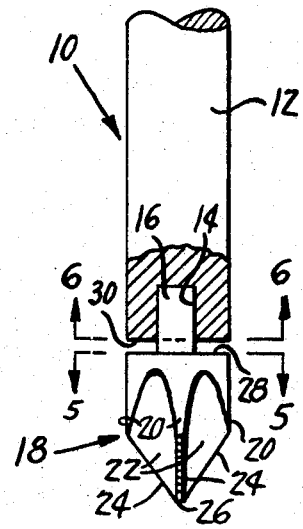
FIGURE 2 is a front elevational view, similar to FIGURE 1, prior to the welding of the bit end to the shank, certain parts being broken away for purposes of illustration.
Figure 3:
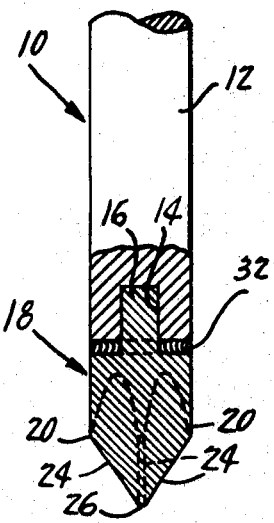
FIGURE 3 is a front elevational view of the device of FIGURE 1, the lowermost end of the tool being broken away for clarity of illustration.
Figure 4:
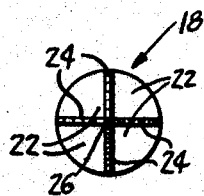
FIGURE 4 is a bottom view of the tool of FIGURE 1 illustrating the radially disposed vanes acting to cooperate with a recess head screw.
Figure 5:
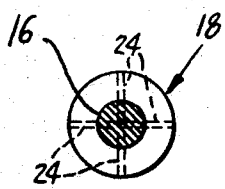
FIGURE 5 is a transverse cross-sectional view of the tool of FIGURE 2 taken substantially along line 5—5 thereof as viewed in the direction indicated by the arrows.
Figure 6:
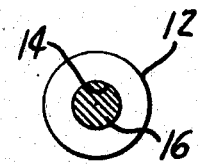
FIGURE 6 is a horizontal transverse cross-sectional view of the tool of FIGURE 2 taken substantially along line 6—6 thereof as viewed in the direction indicated by the arrows.
Figure 7:
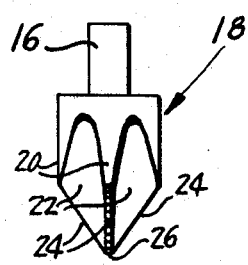
FIGURE 7 is a front elevational view of the bit end of the instant invention.

One of the difficulties in construction of the tool of the instant invention resides in providing a secure connection between bit 18 and shank 12. To overcome this difficulty, pin 16 of bit 18 is made slightly longer than the depth of blind aperture 14 to form a gap between the upper face 28 of bit 18 and the lower face 30 of shank 12 as shown in FIGURE 2. A welding bead 32 is then formed in the gap to produce a secure connection.

It is now seen that there is herein provided an improved screw driving tool which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:

1. In a screw driver of the type having a shank and a bit end which includes a plurality of vanes extending radially from the shank, the vanes converging to a point at the free ends thereof, the improvement wherein the bit end is made of tungsten carbide and wherein means for connecting the bit end to the shank comprise an opening in the end of the shank, a pin portion on the bit end extending into the shank, said pin portion being in length greater than the depth of the opening for forming a gap between the periphery of the shank and the periphery of the bit end and a weld bead formed in the gap for absorbing stresses resulting between the bit end and the shank.

References Cited

UNITED STATES PATENTS

| | | | |
|---|---|---|---|
| 1,826,085 | 10/1931 | Mulock | 29—483 |
| 1,977,845 | 10/1934 | Emmons | 76—108 |
| 2,366,682 | 1/1945 | West et al. | 145—50.1 |
| 2,804,894 | 9/1957 | Rosenburg | 145—50.1 |

ROBERT C. RIORDON, *Primary Examiner.*

R. V. PARKER, *Assistant Examiner.*